(12) United States Patent
Len-Li et al.

(10) Patent No.: US 7,423,705 B2
(45) Date of Patent: Sep. 9, 2008

(54) COLOR CORRECTION OF LCD LIGHTING FOR AMBIENT ILLUMINATION

(75) Inventors: Kevin Lim Len-Li, Perak (MY); Lee Joon Chok, Sarawak (MY); Ng Kee Yean, Penang (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 44 days.

(21) Appl. No.: 10/941,495

(22) Filed: Sep. 15, 2004

(65) Prior Publication Data

US 2006/0056178 A1    Mar. 16, 2006

(51) Int. Cl.
*G02F 1/1335*    (2006.01)

(52) U.S. Cl. .................... 349/61; 349/199; 362/231; 362/561; 362/612; 345/102

(58) Field of Classification Search .................... 349/61
See application file for complete search history.

(56) References Cited

U.S. PATENT DOCUMENTS

| 6,507,159 | B2 * | 1/2003 | Muthu | 315/307 |
| 6,563,479 | B2 * | 5/2003 | Weindorf et al. | 345/77 |
| 7,002,546 | B1 * | 2/2006 | Stuppi et al. | 345/102 |
| 2004/0036820 | A1 * | 2/2004 | Runolinna | 349/61 |

* cited by examiner

*Primary Examiner*—David C. Nelms
*Assistant Examiner*—Nathanael R Briggs

(57) ABSTRACT

Color correction of Liquid Crystal Display (LCD) lighting in response to the color balance of ambient illumination. In response to the color balance of sensed ambient illumination, drive levels of light emitting diodes providing lighting to the LCD are changed.

10 Claims, 1 Drawing Sheet

COLOR CORRECTION OF LCD LIGHTING FOR AMBIENT ILLUMINATION

TECHNICAL FIELD

Embodiments in accordance with the invention relate generally to lighting for color liquid crystal displays (LCDs), and more particularly, for correcting lighting color in color LCDs in response to ambient illumination.

BACKGROUND

Color liquid crystal displays (LCDs) are used in a wide range of devices, from mobile phones, to personal digital assistants, to video display devices such as those found in video cameras and DVD players. These LCDs rely on backlighting, for transmissive displays, or front lighting for reflective displays to illuminate the LCD.

It has been observed that the perceived image and color quality of a color LCD varies with the type and intensity of the ambient illumination, for example, between outdoor sunlight, indoor incandescent lighting, and indoor fluorescent lighting. The spectral power distribution of sunlight, incandescent light, and fluorescent light are quite different. In addition to the spectral power distribution of different illumination sources, wavelength biases may affect LCD image and color quality. For example, most fluorescent lighting is biased towards the blue (400-450 nanometer wavelength), where incandescent lighting is biased towards the red (greater than 600 nanometer).

SUMMARY

In accordance with the invention, ambient illumination is sensed by a color sensor. The output of the color sensor is analyzed to determine the intensity of the ambient illumination and the type of ambient illumination. This information is used to drive light emitting diodes lighting the liquid crystal display.

BRIEF DESCRIPTION OF THE DRAWINGS

The invention will best be understood by reference to the following detailed description of embodiments in accordance with the invention when read in conjunction with the accompanying drawings, wherein.

DETAILED DESCRIPTION

The invention relates to lighting for color liquid crystal displays (LCDs). The following description is presented to enable one skilled in the art to make and use the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments show but is to be accorded the widest scope consistent with the appended claims and with the principles and features described herein.

Figure 1:
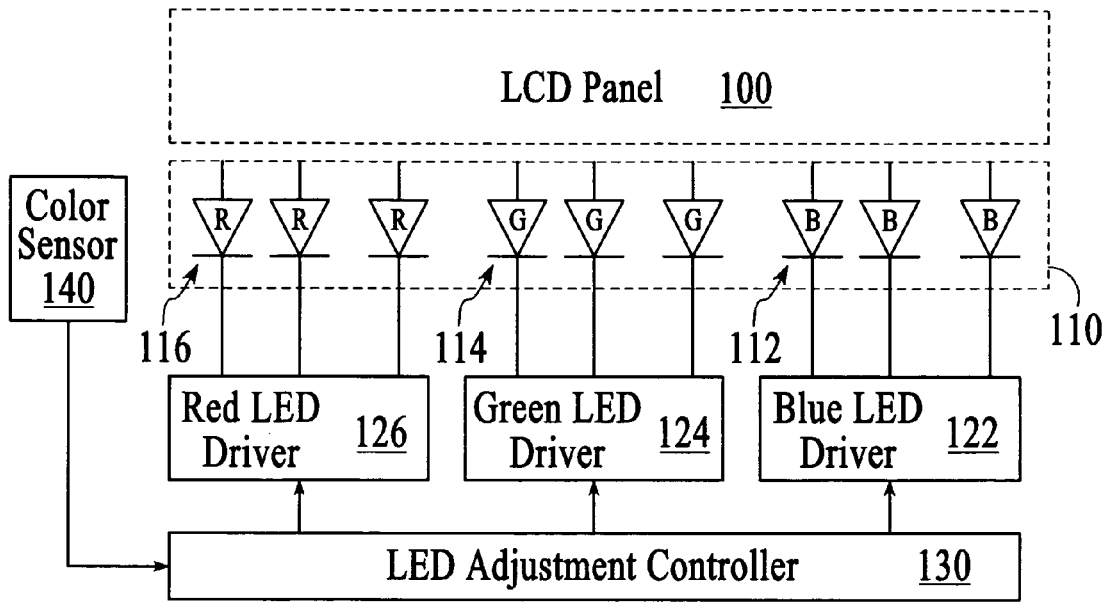
FIG. 1 shows a first block diagram of a display subsystem incorporating the invention.
Figure 2:
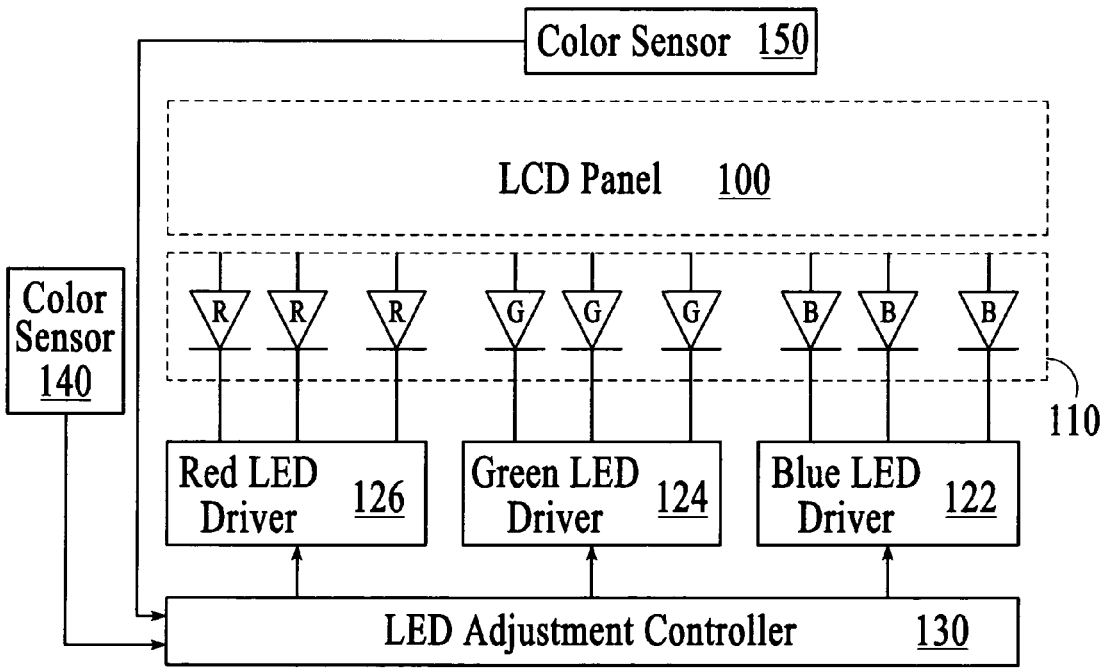
FIG. 2 shows a second block diagram of a display subsystem incorporating the invention.

With reference now to the figures and in particular with reference to FIGS. 1 and 2, representative embodiments for use with the invention are shown. While the invention is shown in particular with respect to backlighting of transmissive LCDs, the techniques are equally applicable to front lighting reflective and transflective mode LCDs.

In a first embodiment shown in FIG. 1, LCD panel 100 is illuminated by light emitting diode (LED) array 110 containing red 116 green 114, and blue 112 light emitting diodes. The LEDs are driven by LED drivers 122, 124, and 126. LED adjustment controller 130 provides drive signals to LED drivers 122, 124, 126, in response to signals from color sensor 140.

Color adjustment controller 130 may be an analog control loop, or it may be a digital control loop in a stand-alone microprocessor dedicated to this particular task, or it may be present as one of many tasks on a microprocessor in the larger device.

Color sensor 140 comprises a plurality of light sensing elements, each sensing a portion of the optical spectrum. Examples include three photodiodes, one with a red filter, one with a green filter, and one with a blue filter. A second embodiment uses a red-filtered photodiode and a blue-filtered photodiode. In either embodiment, an ambient illumination level is calculated from a sum of the individual sensor values. A weighted sum may be used to compensate for overall differences in spectral response of the photodiodes used. The ambient illumination type is also sensed by the color sensor as a ratio of values from the sensing elements. Types of ambient illumination include but are not limited to daylight, incandescent, and fluorescent. The color shift from a target color balance is calculated from the ratio of energy in the short wavelengths, for example energy sensed by a blue sensor, to energy in the long wavelengths, for example energy sensed by a red sensor.

One suitable implementation of the present embodiment may be derived from U.S. Pat. No. 6,448,550 to Nishimura, incorporated herein by reference. Where in the Nishimura patent the photosensors are arranged to minimize incident light exposure, in the present invention, they are arranged to pick up incident light.

In a device which incorporates an imaging sensor, such as a mobile phone which includes an imaging sensor in a camera, the imaging sensor may be used as color sensor 140. JPEG image compression used in image processing converts the RGB image from the imaging sensor to a YUV color space for compression. This YUV data is in the form of luminance, a measure of intensity, and chrominance, color. This YUV data can be averaged over an area of the image to determine an overall illumination level from the Y component, and the chrominance (UV) data averaged similarly to calculate color shift. YUV systems include YIQ, YCC, and YCbCr.

As shown in FIG. 2, a device such as a mobile phone which includes a color sensor 150 for feedback control may be able to select ambient illumination data from sensor 140. In such an embodiment a first sensor, 140, senses the type of ambient light, while the second sensor, 150, is used in the control path for sensing and controlling 130 LED array 110.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. Improved lighting for a liquid crystal display, comprising:
   a first color sensor for sensing the type of ambient light, the first color sensor being configured to sense light of different colors, the first color sensor including a plurality of light sensing elements, a second color sensor for sensing the type of ambient light, the second color sensor also being configured to sense light of different colors, a plurality of light emitting diodes of different wavelengths providing lighting to the liquid crystal display, and a controller operable to be responsive to either the first color sensor or the second color sensor for adjusting the color balance of the light emitting diodes lighting the liquid crystal display.

2. The improved lighting for a liquid crystal display of claim 1 where the light emitting diodes provide backlighting to the liquid crystal display.

3. The improved lighting for a liquid crystal display of claim 1 where the light emitting diodes provide front lighting to the liquid crystal display.

4. Improved lighting for a liquid crystal display, comprising:
- a first color sensor for sensing the type of ambient light, the first color sensor being configured to sense different colors of the ambient light, the first color sensor including a plurality of light sensing elements,
- a plurality of light emitting diodes of different wavelengths providing lighting to the liquid crystal display,
- a second color sensor for sensing the light from the light emitting diodes, the second color sensor being configured to sense different colors of the light from the light emitting diodes, and
- a controller operable to be responsive to the first color sensor and the second color sensor for adjusting the color balance of the light emitting diodes lighting the liquid crystal display.

5. The improved lighting for a liquid crystal display of claim 4 where the light emitting diodes provide backlighting to the liquid crystal display.

6. The improved lighting for a liquid crystal display of claim 4 where the light emitting diodes provide front lighting to the liquid crystal display.

7. The improved lighting for a liquid crystal display of claim 1 where the first color sensor is an imaging sensor of a camera.

8. The improved lighting for a liquid crystal display of claim 4 where the first color sensor is an imaging sensor of a camera.

9. The improved lighting for a liquid crystal display of claim 1 where the plurality of light sensing elements of the first color sensor includes only a red-filtered photodiode and a blue-filtered photodiode.

10. The improved lighting for a liquid crystal display of claim 4 where the plurality of light sensing elements of the first color sensor includes only a red-filtered photodiode and a blue-filtered photodiode.

* * * * *